Patented May 15, 1951

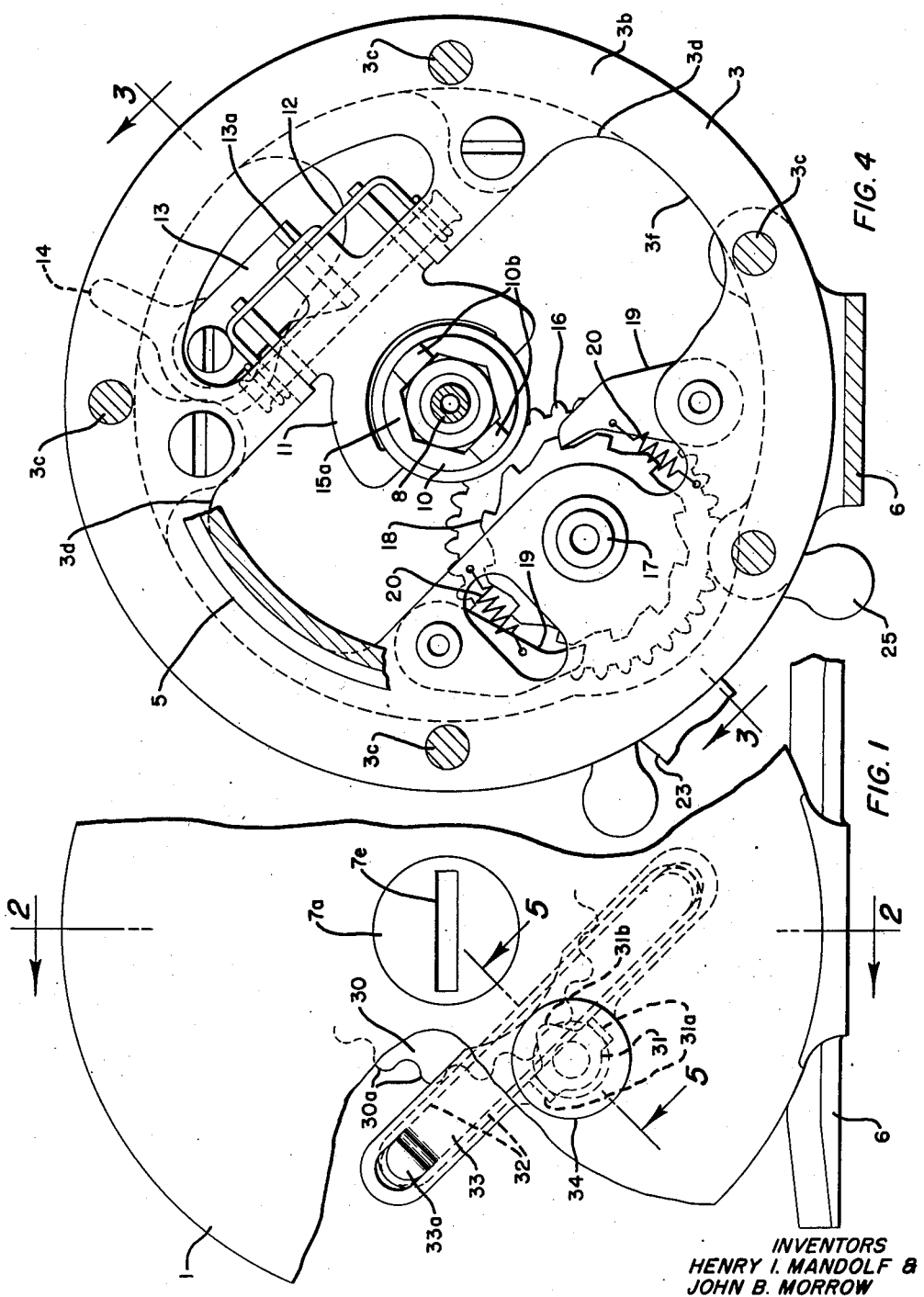

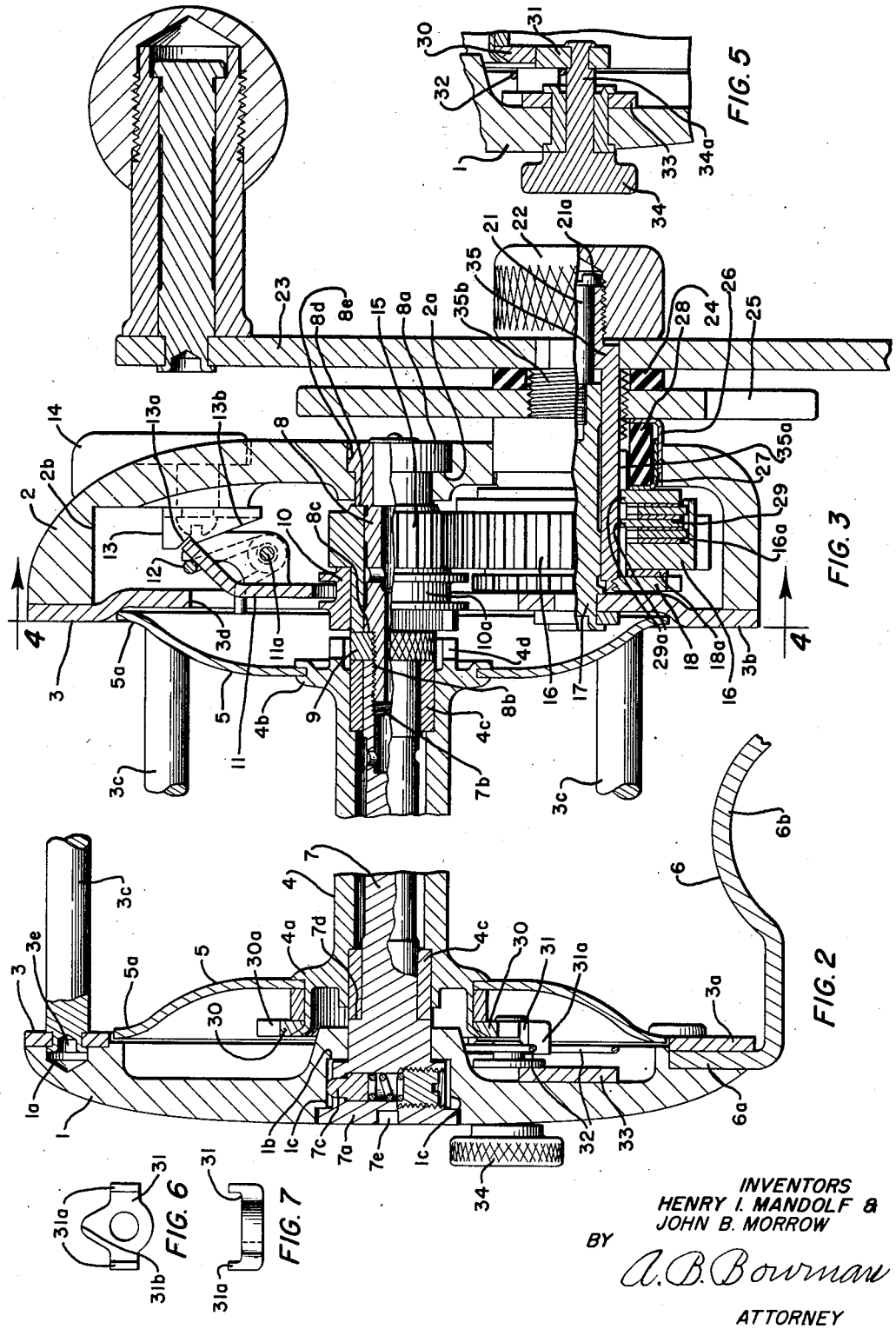

2,553,200

UNITED STATES PATENT OFFICE 2,553,200

FISHING REEL

Henry I. Mandolf and John B. Morrow,
San Diego, Calif.

Application March 25, 1946, Serial No. 656,837

6 Claims. (Cl. 242—84.6)

Our invention relates to a fishing reel and the objects of our invention are:

First, to provide a fishing reel of this class having a readily removable spool connected with the frame of the reel by a shaft having fixed tolerance longitudinally of said spool, whereby, the end play tolerance of the spool is automatically and precisely set up when replaced.

Second, to provide a fishing reel of this class in which the operating mechanism is readily accessible for maintenance and repair when the spool of the reel is removed.

Third, to provide a fishing reel of this class in which a shaft is removed for disconnecting the spool from the reel leaving the gear supporting shaft intact in connection with the reel frame.

With these and other objects in view which will appear hereinafter our invention consists of certain novel features of construction, combination and arrangement of parts and portions as will be hereinafter described in detail and particularly set forth in the appended claims, reference being had to the accompanying drawings and to the characters of reference thereon forming a part of this application in which:

Figure 1 is a fragmentary end elevational view of our fishing reel; Figure 2 is a fragmentary sectional view taken from the line 2—2 of Figure 1 showing portions in elevation to facilitate the illustration; Figure 3 is a longitudinal sectional view taken from the line 3—3 of Fig. 4 showing parts and portions in elevation to facilitate the illustration; Figure 4 is a transverse sectional view taken from the line 4—4 of Fig. 3; Figure 5 is a fragmentary sectional view taken from the line 5—5 of Figure 1; Figure 6 is a side elevational view of the click pawl; and Figure 7 is an edge elevational view of the click pawl.

Similar characters of reference refer to similar parts and portions throughout the several views of the drawings:

The end plates 1 and 2, frame 3, spool hub 4, spool discs 5, mounting bracket 6, main shaft 7, gear shaft 8, nut 9, clutch member 10, clutch arm 11, clutch spring 12, clutch operating cam 13, clutch control handle 14, gears 15 and 16, shaft 17, ratchet wheel 18, pawls 19, pawl springs 20, screw 21, knob 22, operating handle 23, washer 24, star drag adjusting member 25, cups 26 and 27, clutch compression member 28, multiple disc clutch 29, click wheel 30, click pawl 31, spring 32, bracket 33, click control knob 34 and sleeve 35 constitute the principal parts and portions of our fishing reel.

The end plates 1 and 2 are maintained in spaced relation to each other by the frame 3, which is constructed of a pair of flat ring shaped members 3a and 3b secured together by spacer rods 3c as shown best in Figs. 2 and 3 of the drawings. The end 3b of the frame 3 is provided with a cut-out opening 3d therein arranged to permit access to the main operating mechanism recessed in the end plate 2 as shown best in Figs. 3 and 4 of the drawings. It will be noted that the mounting bracket 6 is provided with angular end portions 6a which are secured on the outer sides of the frame plates 3a and 3b as shown best in Figs. 2 and 4 of the drawings. This mounting bracket 6 is provided with a conventional arcuate handle engaging portion 6b arranged to engage the conventional reel handle ferrule of the fishing pole. The spool hub 4 is a hollow cylindrical hub having disc engaging flange portions 4a and 4b on its opposite ends on which are secured the spool discs 5. Pressed in the spool hub 4 are bushings 4c engaging the main shaft 7 about which the reel spool rotates. It will be noted that each of the spool discs is provided with a concave annular curvature 5a on its inner side which terminates at the periphery on a substantially perpendicular plane to the axis of the reel spool, thus the spool discs are substantially parallel to the inner surfaces of the frame plates 3a and 3b promoting reception of the line when being wound on the spool intermediate the spool discs 5. The main shaft 7 extends through the end plate 1 and is provided with a head portion 7a engaging a counterbored shoulder 1b in the end plate 1. Positioned in the head portion 7a, of the main shaft 7, is a spring loaded detent plunger 7c which engages internal notched portions 1c for holding the main shaft 7 in certain adjusted position relatively to the end plate 1. It will be here noted that the end plate 1 is provided with locating recess portions 1a, engaging end portions 3e of the rods 3c as shown best in Fig. 2 of the drawings, thus the end plate 1 is located in concentric relation with the frame 3 for aligning the main shaft 7 with the gear shaft 8. The inner end of the main shaft 7 is provided with a hollow internally threaded portion 7b, at its opposite end from the head portion 7a, which engages external threads on the gear shaft 8 as shown best in Fig. 3 of the drawings. It will be noted that the inner end of the main shaft 7 engages the nut 9, screw threaded on the outer side of the gear shaft 8, and that the bushing 4c, in connection with the spool hub 4, engages the nut 9 forming an end play bearing surface between the bushing 4c and the nut 9. It will be here noted that the main shaft 7 is provided with an end play shoulder 7d positioned near the head portion 7a, arranged to engage the bushing 4c secured in the spool hub 4 at the opposite end from the other bushing 4c engaging the nut 9. The distance between the end of the main shaft 7 and the shoulder portion 7d is slightly greater than the distance from the outer ends of the bushings 4c from each other, providing a fixed end play tolerance for the spool hub 4 carrying the spool discs 5. The head portion 7a, of the main shaft 7, engaging the counterbored shoulder 1b, of the end plate 1, holds the end plate 1 in engaged relation with the frame plate 3a and the end portions 3e of the rods 3c. The gear shaft 8 is provided with a head portion 8a engaging a counterbored portion 2a, of the end plate 2 as shown best in Fig. 3 of the drawings. This gear shaft 8 is provided with external threads 8b, engaged by the nut 9 positioned against the shoulder portion 8c of said gear shaft 8. Spaced from the shoulder 8c, at the head end of the gear shaft 8, is a shoulder portion 8d forming an end play bearing for the gear 15. The distance between the shoulder portions 8c and 8d is slightly greater than the length of the gear 15, providing fixed end play tolerance for the operation of the gear 15 about the shaft 8. The gear 16 meshes with the gear 15 and is journaled on the outer side of the sleeve 35 which is rotatably mounted on the shaft 17 secured in connection with the end plate 3b, of the frame 3. It will be noted that the ratchet wheel 18 is secured on the outer side of the sleeve 35 on which the handle 23 is arranged in fixed relation all as shown best in Fig. 3 of the drawings. Engaging the ratchet wheel 18, as shown best in Fig. 4 of the drawings, are the ratchet pawls 19 operatively connected to springs 20 which tend to force the ratchet pawls 19 into engagement with the teeth of the ratchet wheel 18, which prevent the sleeve 35, together with the handle 23, from being rotated in the opposite direction as turned by the operator when winding line on the reel spool. The ratchet wheel 18 is provided with an integral frictional surface material 18a, engageable with one side of the gear 16 in which the multiple disc clutch 29 is positioned and engaged by the cup 27 in opposed relation to said frictional surface material 18a all as shown best in Fig. 3 of the drawings. It will be noted that the gear 16 is provided with a recess 16a in which the multiple disc clutch 29 is positioned and that the sleeve 35 is provided with a slotted portion 35a, engaged by tab portions 29a of some of the clutch discs of the multiple disc clutch 29. It will be noted that the clutch compression member 28, in the telescopically connected cups 26 and 27 is interposed between the star drag adjustment member 25 and the multiple disc clutch 29 for imposing pressure thereon when the star drag adjustment member 25 is longitudinally adjusted on the external screw threads 35b of the sleeve 35, thus the multiple disc clutch 29 is compressed intermediate the cup 27 and the ratchet wheel 18. It will be noted that the star drag adjustment member 25 is engaged by a resilient washer 24, preferably made of rubber or the like, interposed between the handle 23 and said star drag adjustment member 25. The frictional engagement of the washer 24 intermediate the adjustment member 25 and the handle 23 tends to hold the adjustment member 25 in certain position. The end play of the sleeve 35 on the shaft 17 is controlled by the screw 21 screw threaded in the shaft 17 and having a head portion 21a bearing on the outer end of the sleeve 35. The knob 22 is screw threaded on the outer end of the sleeve 35 and maintains the handle 23 in connection with the sleeve 35 all as shown best in Fig. 3 of the drawings. The clutch member 10 is reciprocally mounted on a hexagonal extension of the gear 15, designated 15a, and this clutch member 10 is provided with an annular groove portion 10a, engaged by the clutch arm 11, pivoted on the frame end plate 3b by means of the pin 11a. The spool hub 4 is provided with engaging portions 4d arranged to engage the clutch portions 10b of the clutch member 10 for transmitting rotary motion from the gear 15 to the spool hub 4 and spool discs 5 in connection therewith. The clutch control handle 14 is pivotally connected with the end plate 2 and supports the clutch operating cam 13 at the inner side of the end plate 2 as shown best in Fig. 3 of the drawing. This clutch operating cam 13 engages the clutch arm 11 for longitudinally shifting the clutch member 10 on the hexagonal extended portion 15a of the gear 15. The clutch operating cam 13 is provided with a notched portion 13a arranged to engage the upper end of the clutch operating arm 11 for holding the clutch member 10 out of engagement with the spool hub 4. This clutch operating cam 13 is also provided with an inclined portion 13b as shown best in Fig. 3 of the drawings arranged for use in retracting the clutch operating arm and disengaging the clutch member 10 from the spool hub 4. The click wheel 30 is secured on one end of the spool hub 4 and is engaged by the click pawl 31 in connection with the shank 34a of the click control knob 34 which is a manual control knob at the outer side of the end plate 1 as shown best in Fig. 2 of the drawings. The bracket 33 as shown in Figs. 1 and 5 of the drawings is secured on the inner side of the end plate 1 and this bracket 33 is provided with tab portions 33a at opposite ends around which is positioned the spring 32, opposite ends of the spring 32 engage tab portions 31a of the click pawl 31 as shown best in Fig. 5 of the drawings. Engagement of the spring 32 with the tabs 31a of the click pawl 31 tend to hold the pawl engaging portions 31b of the click pawl 31 in engagement with the teeth 30a of the click wheel 30.

The operation of our fishing reel is substantially as follows:

In operation the reel is secured to the fishing pole by means of the mounting bracket 6 which is held by the conventional ferrule on the fishing pole. Fishing line is normally secured to the spool hub 4 and is wound thereon intermediate the spool discs 5. When winding line upon the spool hub 4, by means of the handle 23, the sleeve 35 is rotated about the shaft 17 carrying with it the ratchet wheel 18 in engagement with the gear 16 which is frictionally engaged by the multiple disc clutch 29, held in compression by the clutch compression member 28 longitudinally compressed by the screw threaded adjustment of the star drag adjustment member 25 on the outer side of the sleeve 35. Rotation of the sleeve 35, about the shaft 17, by the handle 23, causes the gear 16 to rotate in a corresponding direction in meshed relation with the gear 15 revolubly mounted on the gear shaft 8. The clutch member 10, slidably mounted on the hexagonal extended portion 15a of the gear 15, is engaged with the portions 4d of the spool hub 4 which rotates the spool hub 4 at a relatively higher speed than the rotation of the sleeve 35 in connection with the handle 23. In the operation of the spool engaging clutch 10 the clutch control handle 14 is shifted disengaging the end portion of the clutch arm 11, from the notched portion 13a, of the clutch operating cam 13, permitting the spring 12 to force the clutch member 10 into engagement with the spool hub 4, whereby, the engaging portions 4d are contacted by the engaging portions 10b, of the clutch member 10, interlocking the gear 15 with the spool hub 4.

When line is wound upon the spool hub 4 intermediate the spool discs 5 the line is freely conducted longitudinally of the spool hub 4 on the concave curvatures 5a of the spool discs 5 at their periphery. It will also be noted that the disposition of the mounting bracket 6, at the outer side of the frame plate 3a and 3b, provides an unobstructed inner surface in alignment with the spool discs 5 as shown best in Fig. 2 of the drawings. The adjustment of a multiple disc clutch 29 by the star drag adjustment member 25, is accomplished by compressing the clutch compression member 28. This clutch compression member 28 is a resilient cushion mounted in the telescopic cups 26 and 27 and is preferably made of neoprene or other oil resistant material and is arranged to provide a uniform wide range of adjustment of the multiple disc clutch 29. The washer 24 provides frictional engagement intermediate the star drag adjustment member 25 and the handle 23 for maintaining adjustment of the star drag adjustment member 25 on the externally screw threaded portion 35b of the sleeve 35. The ratchet wheel 18 is rigidly connected to the sleeve 35 and is engaged by the pawls 19, preventing the operating handle 23 from reversing when line is being paid out from the reel spool in connection with a fish, during this operation the spool hub 4 rotates together with the gear 15 and the gear 16 enmeshed therewith and this gear 16 slides in frictional relation with the multiple disc clutch 29 providing tension on the line being paid out in connection with the fish. When the line is slack the line may be wound upon the spool hub 4 intermediate the discs 5 by operating the handle 23, in this manner the tension on the line is equal when being paid out when being rewound on the spool hub 4 intermediate the discs 5. The click wheel 30, secured in connection with the spool hub 4 is engaged by the click pawl 31 having a pawl engaging portion 31b engageable with the teeth 30a of the click wheel 30 all as shown best in Fig. 1 of the drawings. When the click control knob 34 is turned substantially 180° from that as shown in Fig. 1 of the drawings, the pawl engaging portion 31b is disengaged from the teeth 30a of the click wheel 30, thus the click wheel is rendered inoperative. It will be noted that opposite ends of the substantially rectangularly disposed spring engage the tab portions 31a of the click pawl 31, maintaining equal tension when moved in either direction, providing uniform engagement of the click pawl 31 with the click wheel 30. When removing the spool hub 4 and spool discs 5 a coin or other instrument may be inserted in the slotted portion 7e, of the head 7a of the main shaft 7, counterclockwise rotation thereof disconnects the main shaft 7 from the gear shaft 8. The main shaft 7 may then be removed together with the end plate 1 and the spool hub 4 and discs 5, thus removed, the operating mechanism in the end plate 2 map be serviced through the opening 3d in the frame plate 3b as shown best in Figs. 3 and 4 of the drawings. It will be noted that the principal operating mechanism in the end plate 2 is readily viewed through the opening 3d in the frame plate 3b, thus promoting speed of maintenance in connection with the main operating mechanism of our fishing reel. It will be noted that a number of spools may be provided for our fishing reel on which various lines are positioned and that these spools may be readily and quickly changed by simply removing the main shaft 7. The overall lengths of the spools are maintained at fairly close tolerance whereby the distance from the opposed ends of the bushings 4c is relatively the same among various spools. Thus the distance from the shoulder 7b to the end of the main shaft 7 in engagement with the nut 9 provides for the end play tolerance of the spool hub and discs 5 whereby assembly is positive and greatly facilitated. It will be noted that the nut 9 provides a space in between the shoulder portion 8c of the gear shaft 8 and the end of the main shaft 7. Also, the shoulders 8c and 8d provide a tolerance spacing for end play of the gear 15. The head portions 7a and 8a of the main shaft 7 and the gear shaft 8 respectively properly located the end play tolerance of the over-all mechanism intermediate the end plates 1 and 2. The head portion 8a of the gear shaft 8 is maintained against rotation in the end plate 2 by means of a flat portion 8e while the detent member 7c maintains the main shaft 7 against rotation in its engaged relation with its notched portions 1c of the plate 1.

When flushing the mechanism in the end plate 2, the flushing fluid is drained out the opening 3d in the frame plate 3 at one side 3f which is cut away flush with the inner side 2b of the end plate 2.

Though we have shown and described the particular construction, combination and arrangement of parts and portions, we do not wish to be limited to the particular construction, combination and arrangement, but desire to include in the scope of our invention the construction, combination and arrangement substantially as set forth in the appended claims.

Having thus described our invention, what we claim as new and desire to secure by Letters Patent, is:

1. In a fishing reel of the class described, the combination of a frame, end plates maintained in fixed spaced relation at opposite ends of said frame, a gear shaft having a head portion engaging one of said end plates and extending toward the opposite end plate, a main shaft extending through the opposite end plate and having a head portion engageable therewith, said main shaft in screw-threaded relation with said gear shaft and abutted at its screw-threaded end in connection with said gear shaft, a spool hub rotatably mounted on said main shaft adjacent its abutted end, said main shaft provided with an annular shoulder portion in spaced relation with its abutted end, the overall length of said spool hub being slightly shorter than the distance from the abutted end of said main shaft to said annular shoulder portion.

2. In a fishing reel of the class described, the combination of a frame, end plates maintained in fixed spaced relation at opposite ends of said frame, a gear shaft having a head portion engaging one of said end plates and extending toward the opposite end plate, a main shaft extending through the opposite end plate and having a head portion engageable therewith, said main shaft in screw-threaded relation with said gear shaft and abutted at its screw-threaded end in connection with said gear shaft, a spool hub rotatably mounted on said main shaft adjacent its abutted end, said main shaft provided with an annular shoulder portion in spaced relation with its abutted end, the overall length of said spool hub being slightly shorter than the distance from the abutted end of said main shaft to said annular shoulder portion, said gear shaft having a nut on said screw-threaded portion engaging the abutted end of said main shaft, said gear shaft having a shoulder portion engaging said nut at the opposite side thereof from the abutted end of said main shaft, said gear shaft provided with a second shoulder in spaced relation with said nut and a gear intermediate said nut and said second shoulder on said gear shaft freely revoluble on said gear shaft.

3. In a fishing reel of the class described, the combination of a frame, end plates maintained in fixed spaced relation at opposite ends of said frame, a gear shaft having a head portion engaging one of said end plates and extending toward the opposite end plate, a main shaft extending through the opposite end plate and having a head portion engageable therewith, said main shaft in screw-threaded relation with said gear shaft and abutted at its screw-threaded end in connection with said gear shaft, a spool hub rotatably mounted on said main shaft adjacent its abutted end, said main shaft provided with an annular shoulder portion in spaced relation with its abutted end, the overall length of said spool hub being slightly shorter than the distance from the abutted end of said main shaft to said annular shoulder portion, one of said end plates engaged by the head portion of said main shaft held securely in connection with said frame by said main shaft.

4. In a fishing reel of the class described, the combination of a frame, end plates maintained in fixed spaced relation at opposite ends of said frame, a gear shaft having a head portion engaging one of said end plates and extending toward the opposite end plate, a main shaft extending through the opposite end plate and having a head portion engageable therewith, said main shaft in screw-threaded relation with said gear shaft and abutted at its screw-threaded end in connection with said gear shaft, a spool hub rotatably mounted on said main shaft adjacent its abutted end, said main shaft provided with an annular shoulder portion in spaced relation with its abutted end, the overall length of said spool hub being slightly shorter than the distance from the abutted end of said main shaft to said annular shoulder portion, detent means in connection with said main shaft for maintaining the same in certain adjusted position.

5. In a fishing reel of the class described, the combination of a frame, end plates secured in connection with said frame, a gear shaft extending through one of said end plates and having a head portion engageable therewith, a main shaft extending through the opposite end plate and having a head portion engageable therewith; said main shaft arranged in screw-threaded relation with said gear shaft and abutted thereto; said main shaft provided with an enlarged annular portion in spaced relation with its abutted portion, a spool hub mounted on said main shaft intermediate said enlarged annular portion and said abutted portion, the length of said spool hub being slightly less than the distance between the abutted portion and the enlarged diameter portion of said main shaft.

6. In a fishing reel of the class described, the combination of a frame, end plates secured in connection with said frame, a gear shaft extending through one of said end plates and having a head portion engageable therewith, a main shaft extending through the opposite end plate and having a head portion engageable therewith; said main shaft arranged in screw threaded relation with said gear shaft and abutted thereto; said main shaft provided with an enlarged annular portion in spaced relation with its abutted portion, a spool hub mounted on said main shaft intermediate said enlarged annular portion and said abutted portion, the length of said spool hub being slightly less than the distance between the abutted portion and the enlarged diameter portion of said main shaft, said gear shaft having an externally threaded portion and a nut on the outer externally threaded portion of said gear shaft engaging the abutted portion of said main shaft; said gear shaft provided with a shoulder portion engaging said nut and a second shoulder in spaced relation with said nut and an operating gear intermediate said nut and said second shoulder portion freely revoluble on said gear shaft.

HENRY I. MANDOLF.
JOHN B. MORROW.

REFERENCES CITED

The following references are of record in the file of this patent:

UNITED STATES PATENTS

| Number | Name | Date |
|---|---|---|
| 147,414 | MacCord | Feb. 10, 1874 |
| 700,424 | Vom Hofe | May 20, 1902 |
| 803,165 | Holzmann | Oct. 31, 1905 |
| 822,436 | Donaldson | June 5, 1906 |
| 1,523,983 | Lauterbach | Jan. 20, 1925 |
| 1,639,629 | Case | Aug. 16, 1927 |
| 1,765,903 | Case | June 24, 1930 |
| 2,051,259 | James | Aug. 18, 1936 |
| 2,344,132 | Coxe | Mar. 14, 1944 |
| 2,366,920 | McMahon | Jan. 9, 1945 |